United States Patent
Hashish et al.

(10) Patent No.: US 10,411,557 B2
(45) Date of Patent: Sep. 10, 2019

(54) NON-REVERSE RATCHET ASSEMBLY FOR VERTICAL SHAFT MOTORS

(71) Applicant: Siemens Industry, Inc., Alpharetta, GA (US)

(72) Inventors: Emam Hashish, Cincinnati, OH (US); Michael Buil, Amelia, OH (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 931 days.

(21) Appl. No.: 14/978,540

(22) Filed: Dec. 22, 2015

(65) Prior Publication Data

US 2017/0175861 A1 Jun. 22, 2017

(51) Int. Cl.
*H02K 7/07* (2006.01)
*H02K 7/10* (2006.01)
(Continued)

(52) U.S. Cl.
CPC ............ *H02K 7/07* (2013.01); *E21B 43/128* (2013.01); *F16D 43/02* (2013.01); *H02K 7/10* (2013.01);
(Continued)

(58) Field of Classification Search
CPC .......... H02K 7/07; H02K 7/10; H02K 7/1004; H02K 7/1008; H02K 7/1012; H02K 7/1016; H02K 7/102; H02K 7/1021; H02K 7/1025; H02K 7/1026; H02K 7/1028; H02K 7/104; H02K 7/106; H02K 7/108; H02K 7/1085; H02K 7/11; H02K 7/112; H02K 7/1125; H02K 7/114; H02K 7/116; H02K 7/1163; H02K 7/1166; H02K 7/12; H02K 7/1185;
(Continued)

(56) References Cited

U.S. PATENT DOCUMENTS 1,883,966 A * 10/1932 Krause .................... F16D 41/12
192/46
1,923,842 A 8/1933 Pratt
(Continued)

FOREIGN PATENT DOCUMENTS

CN    201109632     *  9/2008 ............. B65G 23/04
DE    4023258 A1    *  2/1991 ............. F04D 17/04

OTHER PUBLICATIONS

Hofe Ruediger; Thien Gerhard, Blocking Reverse Motion in Cross Flow Fan using Pre-sprung Blocking Elements, Feb. 21, 1991, DE 4023258 (English Machine Translation) (Year: 1991).*
(Continued)

*Primary Examiner* — Julio C. Gonzalez
*Assistant Examiner* — Alexander A Singh

(57) ABSTRACT

A non-reverse ratchet assembly includes a stationary ring with a plurality of saw teeth equally distributed over an outer surface of the stationary ring; a rotating housing with a rotating ring surrounding the stationary ring; and a plurality of ratchet elements equally distributed and positioned between the rotating ring and the stationary ring, wherein each ratchet element is configured to engage with or disengage from the plurality of saw teeth, and wherein each ratchet element comprises a slot for a distributed load sharing of the plurality of ratchet elements when engaging with the plurality of saw teeth. Furthermore, a vertical shaft motor including a non-reverse ratchet assembly is described.

19 Claims, 4 Drawing Sheets

(51) Int. Cl.
*E21B 43/12* (2006.01)
*H02K 7/112* (2006.01)
*H02K 7/116* (2006.01)
*F16D 43/02* (2006.01)

(52) U.S. Cl.
CPC ............. *H02K 7/112* (2013.01); *H02K 7/116* (2013.01); *E21B 43/126* (2013.01)

(58) Field of Classification Search
CPC ... H02K 7/7118; E21B 43/128; E21B 43/126; F16D 59/00; F16D 41/12; F16D 41/00; F16D 43/02; F16H 31/001
USPC ...... 310/78, 41, 76, 77, 92, 93, 123; 74/126, 74/527, 578; 335/74
See application file for complete search history.

(56) References Cited

U.S. PATENT DOCUMENTS

| | | | |
|---|---|---|---|
| 2,351,553 A | 6/1944 | Simpson | |
| 2,640,573 A | 6/1953 | Shenk | |
| 2,710,504 A | 6/1955 | Dodge | |
| 3,165,936 A * | 1/1965 | Daugherty | F16H 31/00 310/78 |
| 3,352,384 A | 11/1967 | Stevens, Jr. | |
| 3,748,508 A * | 7/1973 | Woolley | H02K 7/1185 310/41 |
| 4,658,667 A * | 4/1987 | Schuller | B62M 25/04 74/473.14 |
| 5,064,037 A | 11/1991 | Long, Jr. | |
| 5,143,189 A | 9/1992 | Meier-Burkamp | |
| 5,205,386 A * | 4/1993 | Goodman | F02N 15/027 192/104 C |
| 5,524,742 A | 6/1996 | Pratt | |
| 5,607,030 A | 3/1997 | Swift et al. | |
| 6,575,275 B2 | 6/2003 | Muramatsu et al. | |
| 6,814,200 B2 | 11/2004 | Stefina | |
| 8,491,439 B2 | 7/2013 | Kimes | |
| 2011/0214963 A1 * | 9/2011 | Beylotte | E21B 4/02 192/106 R |
| 2016/0084291 A1 * | 3/2016 | Stewart | F16B 39/32 411/327 |

OTHER PUBLICATIONS

Jianzong Cao; Wei Qian, Electric Drum, Sep. 3, 2008, Changzhou Driving Transportation, CN 201109632 (English Machine Translation) (Year: 2008).*

* cited by examiner

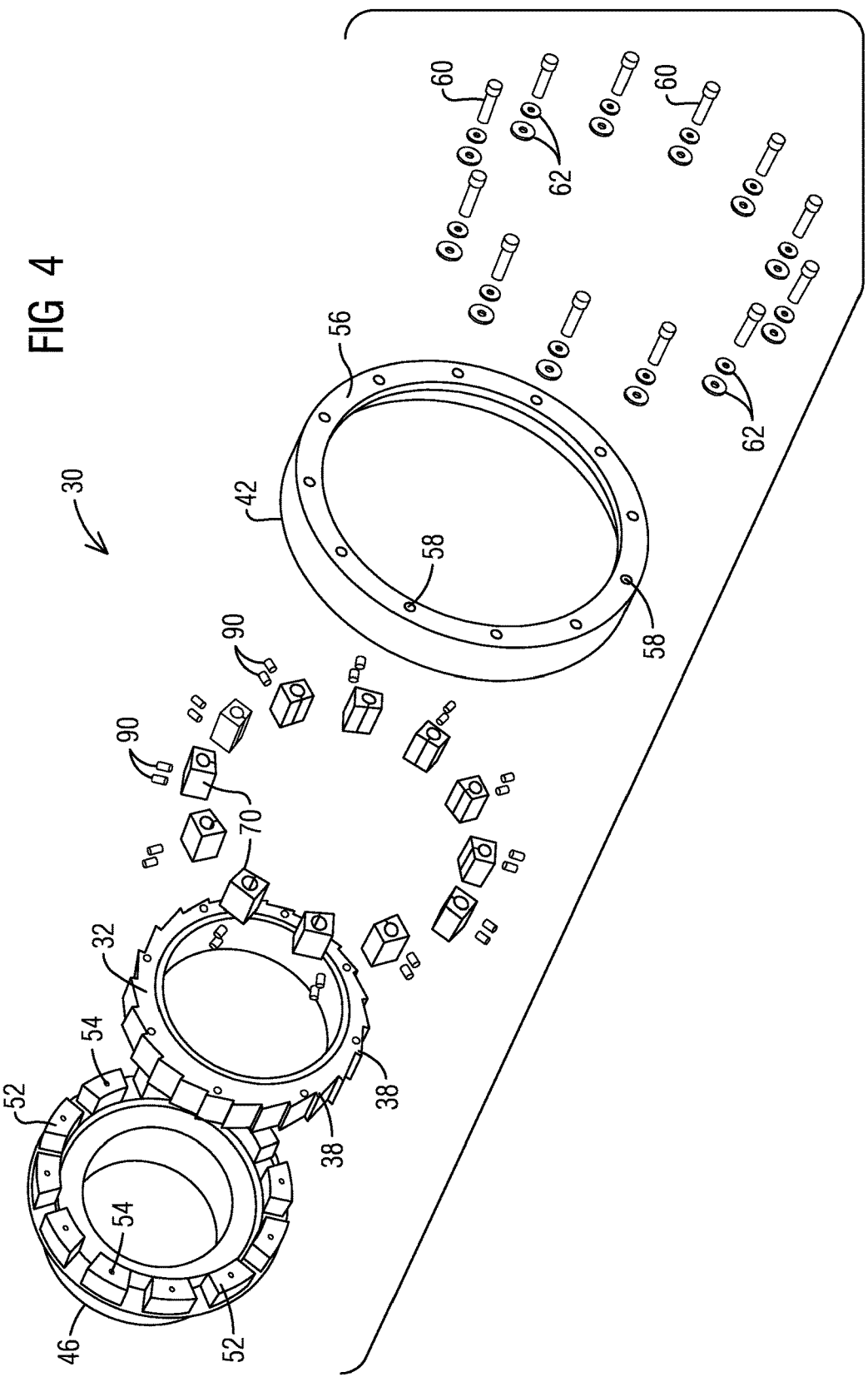

NON-REVERSE RATCHET ASSEMBLY FOR VERTICAL SHAFT MOTORS

BACKGROUND

1. Field

Aspects of the present invention generally relate to a non-reverse ratchet assembly for vertical shaft motors and a vertical shaft motor comprising a non-reverse ratchet assembly.

2. Description of the Related Art

Non-reverse ratchets are typically used in deep well applications where vertical electric motors that drive pumps, for example water pumps, are installed. The application can comprise for example water lubricated pump bearings. A non-reverse ratchet, herein also referred to as NRR, provides immediate protection against reversing due to phase reversals or from backspin at shutdown. The NRR stops a shaft of the vertical motor while the pump water column is receding. Otherwise, as the water flows back into the well, it will run the pump and electric motor in reverse at unbounded speed that could reach destructive levels for either the pump or the motor or both.

Currently, there are a few NRR devices available for large vertical motors that drive pumps that require a NRR. Smaller applications use for example a ball type NRR which is a virtually maintenance free device. But the ball type NRR has limited torque capacity since it depends on locking the machine on one ball only. Larger machines use for example a sprag type NRR, which has the required torque capacity. But the sprag type NRR is expensive and may require maintenance, high accuracy of machining and setting. Even a lubrication free sprag type NRR would demand tight tolerance on assembly to function correctly. Thus, there may be a need for a high capacity, maintenance free non-reverse ratchet for large vertical motors.

SUMMARY

Briefly described, aspects of the present invention relate to non-reverse ratchet assemblies, and vertical shaft motors, for example vertical shaft induction motors, comprising a non-reverse ratchet assembly. In accordance with exemplary embodiments of the present inventions, a high capacity non-reverse ratchet assembly is provided which allows torque sharing between ratchet elements while requiring no maintenance or high accuracy in machining or assembly.

A first aspect of the present invention provides a non-reverse ratchet assembly comprising a stationary ring comprising a plurality of saw teeth equally distributed over an outer surface of the stationary ring; a rotating housing comprising a rotating ring, the rotating ring surrounding the stationary ring; and a plurality of ratchet elements equally distributed and positioned between the rotating ring and the stationary ring, wherein each ratchet element is configured to engage with or disengage from the plurality of saw teeth, and wherein each ratchet element comprises a slot for a distributed load sharing of the plurality of ratchet elements when engaging with the plurality of saw teeth.

A second aspect of the present invention provides a vertical shaft motor comprising a motor shaft positioned inside a motor housing; and a non-reverse ratchet assembly positioned inside the motor housing, the non-reverse ratchet assembly comprising a stationary ring comprising a plurality of saw teeth equally distributed over an outer surface of the stationary ring; a rotating housing comprising a rotating ring surrounding the stationary ring, the rotating housing mounted on the motor shaft; and a plurality of ratchet elements equally distributed and positioned between the rotating ring and the stationary ring, wherein each ratchet element is configured to engage with or disengage from the plurality of saw teeth by centrifugal forces based upon rotation of the motor shaft, and wherein each ratchet element comprises a slot for a distributed load sharing of the plurality of ratchet elements when engaging with the plurality of saw teeth.

BRIEF DESCRIPTION OF THE DRAWINGS

FIG. 4 illustrates an exploded view of the non-reverse ratchet assembly as shown in FIGS. 2-3 in accordance with an exemplary embodiment of the present invention.

DETAILED DESCRIPTION

To facilitate an understanding of embodiments, principles, and features of the present invention, they are explained hereinafter with reference to implementation in illustrative embodiments. In particular, they are described in the context of a non-reverse ratchet assembly, and a vertical shaft motor comprising a non-reverse ratchet assembly. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
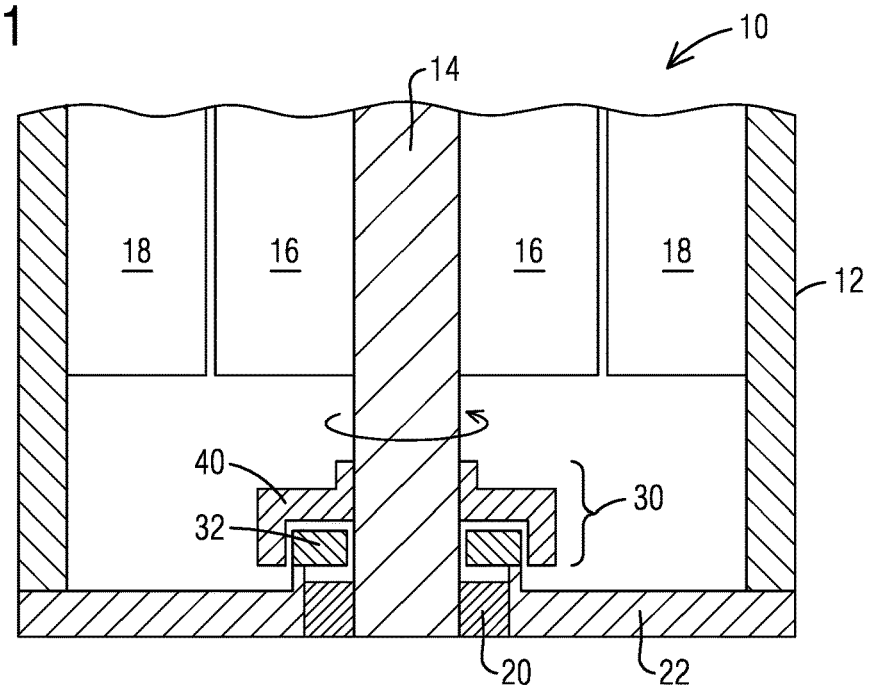
FIG. 1 illustrates a partial schematic elevational cross sectional view of an embodiment of a vertical shaft motor in accordance with an exemplary embodiment of the present invention.

FIG. 1 illustrates a partial schematic elevational cross sectional view of an embodiment of a vertical shaft motor 10 comprising a non-reverse ratchet assembly 30 in accordance with an exemplary embodiment of the present invention. The vertical shaft motor 10 comprises a housing 12 and a rotating shaft 14 that supports a rotor core 16. The vertical shaft motor 10 can be for example a vertical shaft induction motor. The rotor core 16 is surrounded by and electromagnetically coupled to a stator 18. A lower mechanical bearing 20 supports at least radial loads imparted on the shaft 14. The vertical shaft motor 10 further comprises an upper mechanical bearing (not illustrated) which supports radial and axial thrust loads imparted on the shaft 14 by electrodynamic interaction between the rotor 14 and stator 18 as well as external loads applied to the shaft 14. The vertical motor 10 further comprises an end cap 22 which is coupled to the housing 12 and can be considered part of the housing 12.

FIG. 1 further illustrates the non-reverse ratchet assembly 30 comprising rotating and stationary components. The non-reverse ratchet assembly 30 is herein also referred to as NRR-assembly 30 or simply NRR 30. It should be noted that the NRR 30 is illustrated only schematically in FIG. 1. The NRR 30 comprises a stationary ring 32, herein also referred to as stationary drum, and a rotating housing 40, herein also referred to as rotating runner or runner. The NRR 30 is located at an end of the vertical motor 10, specifically at a bottom end of the motor 10 when viewed from a side elevational view of the motor 10.

The non-reverse ratchet assembly 30 is typically used in deep well applications where the vertical electric motor 10 drives for example water pumps. The NRR 30 provides immediate protection against reversing of the motor 10 due to phase reversals or from backspin at shutdown of the motor 10. The NRR 30 stops the vertical motor 10, in particular the shaft 14, while the pump water column is receding. Otherwise, as the water flows back into the well, the pump would operate in reverse with unbounded speed. If allowed to run at high speed in reverse, failure would occur.

The rotating housing 40 of the NRR 30 is positioned inside the motor housing 12 and is fastened to the motor shaft 14, which means that when the shaft 14 rotates, the rotating housing 40 rotates together with the shaft 14. The stationary drum 32 is a stationary component of the NRR 30 and can be fastened to the end cap 22 and/or the housing 12 of the motor 10. In an exemplary embodiment, the stationary drum 32 can be integrated into the end cap 22. The stationary drum 32 can be a modified end cap 22 which is an existing part of the vertical motor 10. The modified end cap 22 can be keyed to the motor housing 12, specifically a lower part of the motor housing 12 so as to hold a stopping torque. In an exemplary embodiment, the modified end cap 22 can be anchored to lower bearing brackets of the bearing 20. For example, the end cap 22 can be fastened with two machined keys that engage in the bearing brackets when the end cap 22 is bolted on. End cap screws can be larger than standard end cap screws.

Figure 2:
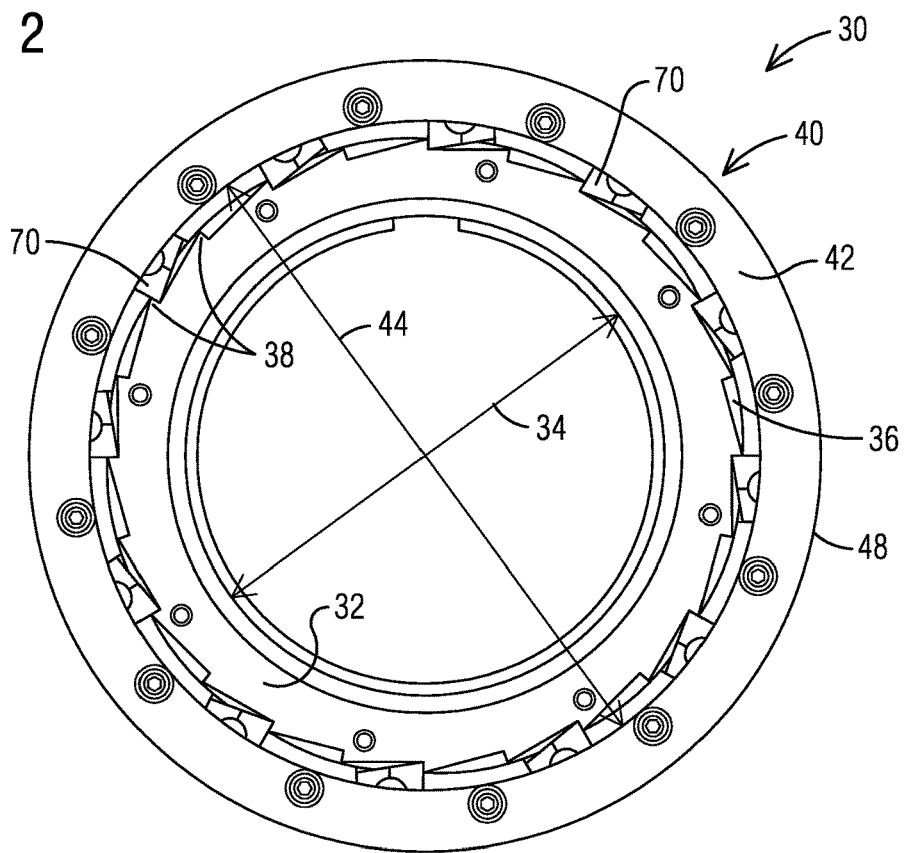
FIG. 2 illustrates a bottom view of an embodiment of a non-reverse ratchet assembly in accordance with an exemplary embodiment of the present invention.
Figure 3:
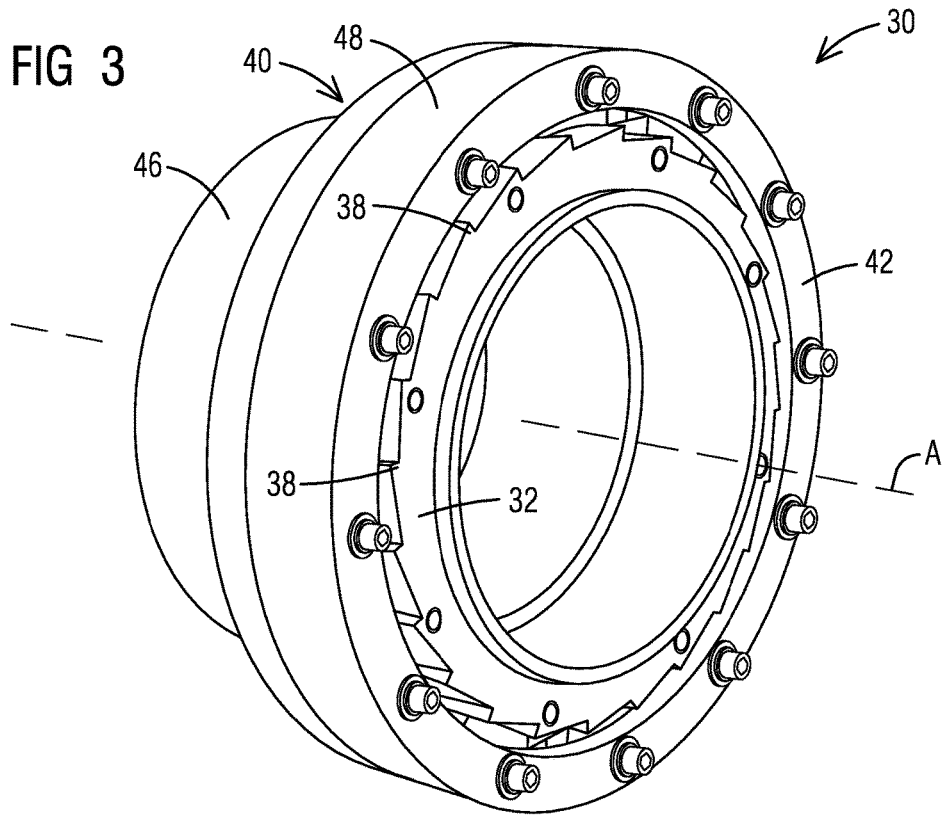
FIG. 3 illustrates a perspective view of the non-reverse ratchet assembly as shown in FIG. 2 in accordance with an exemplary embodiment of the present invention.

FIG. 2 illustrates a bottom view of an embodiment of a non-reverse ratchet assembly 30 in accordance with an exemplary embodiment of the present invention. FIG. 3 illustrates a perspective view of the non-reverse ratchet assembly 30 of FIG. 2 in accordance with an exemplary embodiment of the present invention. FIG. 4 illustrates an exploded view of the non-reverse ratchet assembly 30 of FIGS. 2-3 in accordance with an exemplary embodiment of the present invention.

With reference to FIGS. 2-4, the NRR 30 comprises the rotating housing 40 and the stationary drum 32. The stationary drum 32 comprises a ring shape, wherein an inner diameter 34 of the stationary drum 32 is greater than a diameter of the shaft 14 so that the shaft 14 can receive the stationary drum 32, but the stationary drum 32 is clear off the shaft 14 (see FIG. 1), so that the stationary drum 32 does not rotate with the shaft 14 and does also not interfere with the rotation of the shaft 14. The stationary drum 32 comprises equally distributed saw teeth 38 arranged on an outer surface 36 of the drum 32. The stationary drum 32 is fastened to the end cap 22 and/or the housing 12 of the vertical motor 10, or alternatively, the stationary drum 32 is embodied as the end cap 22. In this case, the end cap 22 has several functions which are the function of an end cap as well as the function of a stationary element of the NRR 30.

The rotating housing 40 comprises multiple components, which are for example a rotating ring 42, a rotating ring holder 46, and ratchet elements 70. The rotating ring 42 houses the ratchet elements 70 and has a greater inner diameter 44 than the outer surface 36 of stationary drum 32 so that the stationary drum 32 can be inserted in the rotating ring 42 and the ratchet elements 70 are positioned opposite the saw teeth 38. The ratchet elements 70 are equally distributed and positioned between the stationary drum 32 and the rotating ring 42.

FIGS. 2-4 show an exemplary number of 12 ratchet elements 70. The NRR 30 can comprise less or more than 12 ratchet elements 70, for example 8 or 24 ratchet elements 70, depending on for example a size of the NRR 30. The ratchet elements 70 can comprise for example high carbon steel and can be shaped as wedges as will be further described in FIGS. 5-6.

The plurality of saw teeth 38 are provided on an outer surface 36 of the stationary drum 32 and are equally distributed over the outer surface 36 of the stationary drum 32. In the exemplary embodiment of FIGS. 2-4, the stationary drum 32 comprises 24 saw teeth, which is twice the number of ratchet elements 70. As the number of ratchet elements 70 can vary, the number of saw teeth 38 can also vary. For example, if the NRR 30 comprises 8 ratchet elements 70, the stationary drum 32 can comprise for example 16 saw teeth 38. When the stationary drum 32 is embodied as the end cap 22, the end cap 22, comprising a ring shape, is machined with saw teeth 38 on an outside.

When the vertical motor 10 is operating and the shaft 14 with the rotating element 40 of the NRR 30 are rotating around an axis of rotation A, centrifugal forces will push the ratchet elements 70 against a back wall 48 of the rotating ring 42 away from the ratchet stationary ring 32 and away from the saw teeth 38. When the ratchet elements 70 are pushed against the back wall 48, they will compress one or more springs 90 (see FIG. 4 and FIGS. 7-8). Each ratchet element 70 is assigned one or more springs 90 which are positioned between the respective ratchet element 70 and the rotating ring 42. The one or more springs 90 are designed to be compressed at speed lower than an operating speed of the motor 10. The operating speed of a vertical shaft motor 10 can be for example between 400 rpm and 3600 rpm, wherein the one or more springs 90 are designed to be compressed between 200 rpm and 300 rpm. When the vertical motor 10 slows down and/or stops, the springs 90 overcome friction and push the ratchet elements 70 to engage with the saw teeth 38 of stationary drum 32, preventing the vertical motor 10, specifically the shaft 14 with rotor core 16, from turning in an opposite direction of the regular direction of rotation of the shaft 14. Also, the centrifugal forces will disengage the ratchet elements 70 at the speed that is below the operating speed of the vertical motor 10.

FIGS. 3-4 show the rotating ring holder 46 of the rotating housing 40 which receives and holds the rotating ring 42. The ring holder 46 comprises a plurality of supporting elements 52, each supporting element 52 comprising at least one recess 54. The rotating ring 42 comprises on one side a ring shaped cover 56. The ring shaped cover 56 comprises a plurality of holes or bores 58 corresponding to the recesses 54 of the supporting elements 52. A plurality of fastening elements 60, which can be for example bolts, pins or screws, are provided for fastening the ring 42 to the holder 46. The number of fastening elements 60 corresponds to the number of recesses 54 and bores 58 so that one fastening element 60 is assigned per pair of recess 54 and bore 58. In the exemplary embodiment as shown in FIGS. 2-4, the NRR 30 comprises 12 fastening elements 60 for 12 pairs of recesses 54 and bores 58. It should be noted that the NRR 30 can comprise more or less than 12 recesses 54, bores 58 and fastening elements 60. When assembling the NRR 30, the fastening elements 60 are mounted to the supporting elements 52, wherein the fastening elements 60 are pushed through the holes 58 and inserted in the recesses 54 of the supporting elements 52. FIG. 4 further shows shims or washers 62 which can be used in connection with the fastening elements 60.

Figure 5:
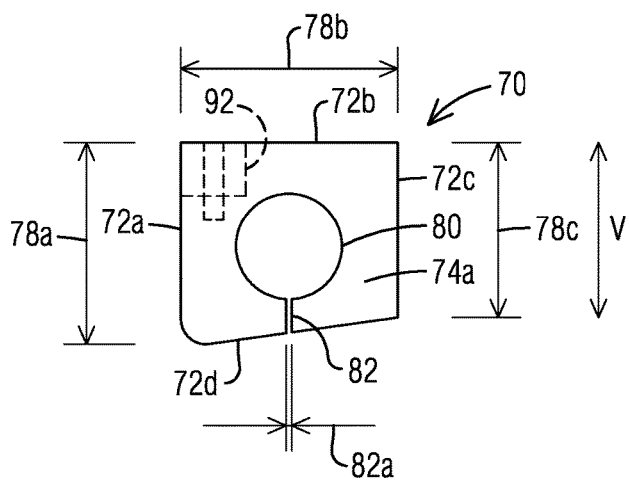
FIG. 5 illustrates a side view of a ratchet element of the non-reverse ratchet assembly in accordance with an exemplary embodiment of the present invention.
Figure 6:
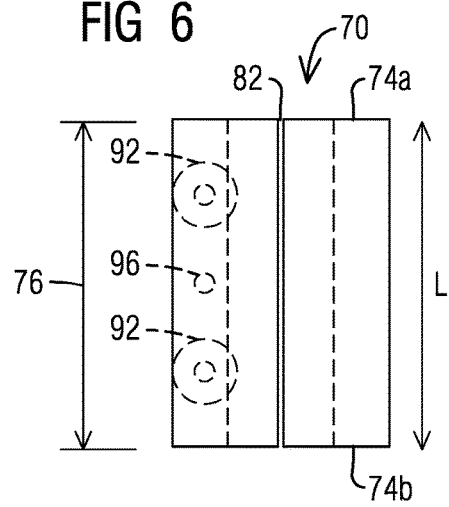
FIG. 6 illustrates a bottom view of the ratchet element of the non-reverse ratchet assembly as shown in FIG. 5 in accordance with an exemplary embodiment of the present invention.

FIG. 5 illustrates a side view of a ratchet element 70 of the NRR 30 in accordance with an exemplary embodiment of the present invention. FIG. 6 illustrates a bottom view of the ratchet element 70 of the NRR 30 of FIG. 5 in accordance with an exemplary embodiment of the present invention.

With reference to FIGS. 5-6, the ratchet element 70 can comprise a wedge shape configured such that the ratchet element 70 is able to engage in one of the saw teeth 38 of the stationary drum 32 when the vertical motor 10 slows down below a certain speed and/or stops completely. For example, the ratchet element 70 comprises a shape of a trapezoidal prism. A trapezoidal prism is a shape that has trapezoid cross-sections in one direction and rectangular cross-sections in the other directions. The ratchet element 70 when configured as a trapezoidal prism has a lateral area comprising four side faces 72a, 72b, 72c, 72d, and identical bases 74a and 74b. Side faces 72a and 72c are parallel, wherein side faces 72b and 72d are non-parallel. The bases 74a and 74b comprise identical trapezoidal shapes. In an exemplary embodiment, a length 76 of the ratchet element 70 can be for example 1.500 in (inches). A width 78a of side face 72a can be for example 0.950 in, a width 78b of side face 72b can be for example 1.000 in, and a width 78c of side face 42c can be for example 0.800 in.

Further, the ratchet element 70 comprises an opening or hole 80 in a longitudinal direction L of the ratchet element 70 to limit stress concentration. The opening or hole 80 is arranged basically centrically within the ratchet element 70. Each ratchet element 70 comprises a tight slot or gap 82 extending in the longitudinal direction L of the ratchet element 70 and adjacent to the opening 80, wherein the slot 82 also extends in a vertical direction V from the opening 80 toward the angled side face 72d. The longitudinal direction L of the ratchet element 70 is parallel to the axis of rotation A of the non-reverse ratchet assembly 30 (see FIG. 3) when the ratchet element 70 is positioned in the NRR 30.

The slot 82 can comprise a width 82a of for example 0.015 in (inch). One of ordinary skill in the art will appreciate that depending on for example a size and material used for the ratchet element 70, the slot 82 can be smaller or greater than 0.015 in. The slot 82 allows each ratchet element 70 to deflect and/or compress slightly under load. The ratchet elements 70 are under load when engaged in the saw teeth 38 of the stationary drum 32 in order to stop rotation of the shaft 14. Thus, by providing the slot 82 for each ratchet element 70, it is possible to bring all ratchet elements 70 into load sharing and the ratchet elements 70 will engage easier in the saw teeth 38 since some play and/or tolerance is provided by each ratchet element 70. In other words, the slots 82 provide spring flexibility and introduce resilience to increase participation of the ratchet elements 70 in load carrying capacity. Furthermore, the slots 82 also allow less machining accuracy. FIGS. 5-6 further illustrate drilled holes 92 for housing the one or more springs 90 which will be described in more detail in FIGS. 7-8.

Figure 7:
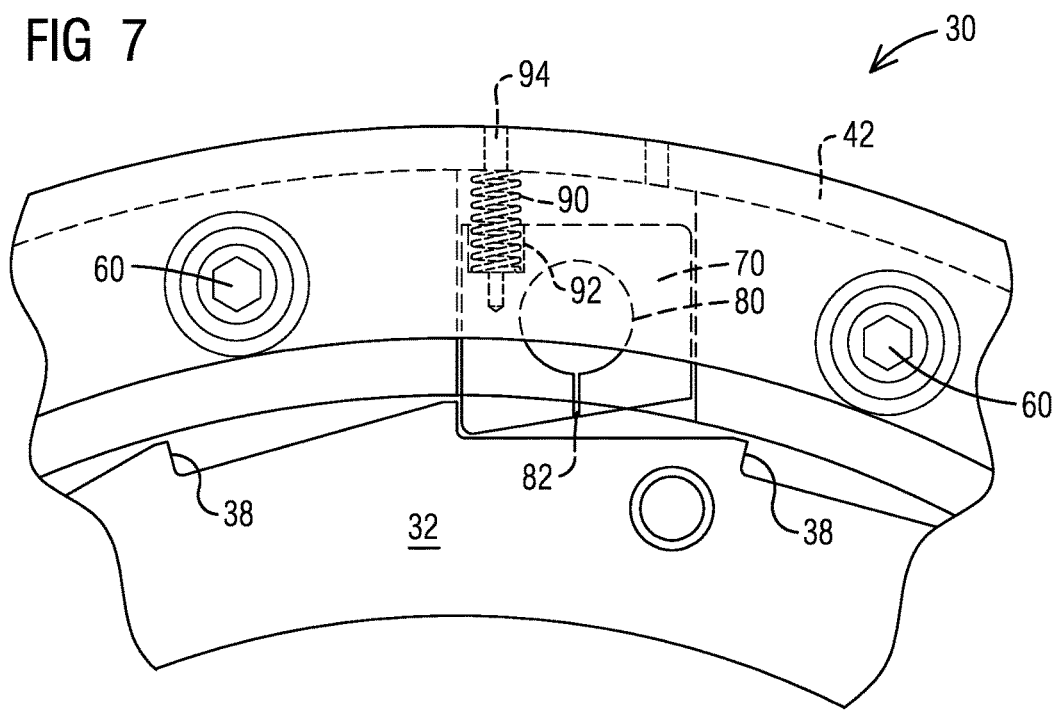
FIG. 7 illustrates a partial side view of a non-reverse ratchet assembly including a ratchet element in a first position in accordance with an exemplary embodiment of the present invention.

FIG. 7 illustrates a partial side view of the NRR 30 and the ratchet element 70 in a first position in accordance with an exemplary embodiment of the present invention. Specifically, FIG. 7 shows the stationary drum 32 with the saw teeth 38, and the rotating ring 42 with the ratchet element 70 in a first position which is a locked position. In the locked position, the ratchet element 70 engages with the saw teeth 38 in order to stop rotation of the shaft 14 of the vertical motor 10. The one or more springs 90 are positioned between the ratchet element 70 and the rotating ring 42 and are decompressed in the locked position.

Figure 8:
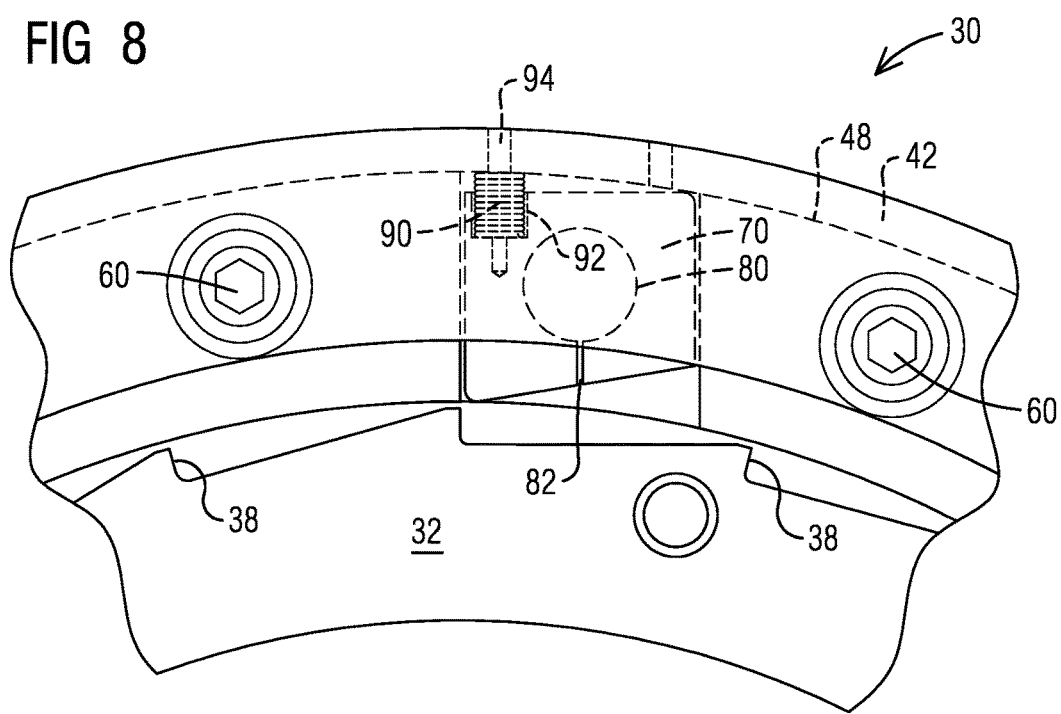
FIG. 8 illustrates a partial side view of a non-reverse ratchet assembly including a ratchet element in a second position in accordance with an exemplary embodiment of the present invention.

According to the exemplary embodiment of FIGS. 7-8, the ratchet element 70 comprises two springs 90 which are housed each in a recess 92, which are for example drilled holes, at a back of the ratchet element 70. FIGS. 7-8 show a first spring 90, wherein a second spring 90 is arranged behind the first spring 90. The springs 90 are each supported by a pin 94 fastened to the rotating ring 42 and extending in the recess 92. Between the two recesses 92 is a threaded hole 94, see FIG. 6, that is used to pull back the ratchet element 70, using for example threaded screws, in order to perform the original NRR assembly 30. When the NRR 30 is mounted to the vertical motor 10 and is in a final position within the motor 10, the threaded screws are removed.

FIG. 8 illustrates a partial side view of the NRR 30 including the ratchet element 70 in a second position in accordance with an exemplary embodiment of the present invention. Specifically, FIG. 8 shows the stationary drum 32 with the saw teeth 38, and the rotating ring 42 with the ratchet element 70 in a second position which is an unlocked position. The unlocked position of the ratchet elements 70 is achieved by the act of centrifugal force at speed of the vertical motor 10 lower than the operating speed. The operating speed of a vertical shaft motor 10 can be for example between 400 rpm and 3600 rpm, wherein the speed lower than the operating speed is for example between 200 rpm and 300 rpm. Centrifugal forces will push the ratchet element 70 against the back wall 48 of the rotating ring 42 away from the ratchet stationary ring 32 and away from the saw teeth 38. When the ratchet elements 70 are pushed against the back wall 48, they will compress the springs 90. As noted before in connection with FIG. 7, during manufacturing and assembling of the NRR 30, the unlocked position of the ratchet element 70 is achieved using temporary threaded screws and threaded hole 94 (see FIG. 6). FIGS. 7-8 further illustrate the fastening elements 60 used for fastening the rotating ring 42 to the rotating ring holder 46. Also, the slot 82 and opening 80 of the ratchet element 70 are shown.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

The invention claimed is:
1. A non-reverse ratchet assembly comprising:
  a stationary ring comprising a plurality of saw teeth equally distributed over an outer surface of the stationary ring;
  a rotating housing comprising a rotating ring, the rotating ring surrounding the stationary ring; and a plurality of ratchet elements equally distributed and positioned between the rotating ring and the stationary ring, wherein each ratchet element is configured to engage with or disengage from the plurality of saw teeth, and wherein each ratchet element comprises a slot to bring all ratchet elements of the plurality of ratchet elements into load sharing and the plurality of ratchet elements will engage easier in the plurality of saw teeth since some play and/or tolerance is provided by each ratchet element, wherein each ratchet element comprises an opening in a longitudinal direction of the ratchet element, wherein the slot extends in the longitudinal direction, the longitudinal direction being parallel to an axis of rotation of the non-reverse ratchet assembly, wherein the opening is arranged centrically within each ratchet element for limiting stress concentration, wherein the slot physically touches an end of the opening, wherein each ratchet element comprises an angled side face, and wherein the slot extends in a vertical direction from the opening toward the angled side face of each ratchet element.

2. The non-reverse ratchet assembly of claim 1, wherein the slot allows compression of the ratchet element when engaging with one of the plurality of saw teeth.

3. The non-reverse ratchet assembly of claim 1, wherein each ratchet element comprises at least one spring to facilitate engaging with or disengaging from one of the plurality of saw teeth.

4. The non-reverse ratchet assembly of claim 3, wherein the at least one spring is located in a recess positioned in a back side of the ratchet element, the back side being adjacent to the rotating ring.

5. The non-reverse ratchet assembly of claim 1, wherein each ratchet element comprises a shape of a trapezoidal prism with a rectangular cross-section in a longitudinal direction and a trapezoid cross-section in a direction perpendicular to the longitudinal direction.

6. The non-reverse ratchet assembly of claim 1, wherein each ratchet element comprises high carbon steel.

7. The non-reverse ratchet assembly of claim 1, wherein the rotating housing further comprises a rotating ring holder, the rotating ring being fastened to the rotating ring holder, and the rotating housing being mountable to a shaft of a vertical shaft motor.

8. The non-reverse ratchet assembly of claim 7, wherein the stationary ring is configured to be used as an end cap of the vertical shaft motor.

9. A vertical shaft motor comprising:
a motor shaft positioned inside a motor housing; and
a non-reverse ratchet assembly positioned inside the motor housing, the non-reverse ratchet assembly comprising:
   a stationary ring comprising a plurality of saw teeth equally distributed over an outer surface of the stationary ring,
   a rotating housing comprising a rotating ring surrounding the stationary ring, the rotating housing mounted on the motor shaft; and
   a plurality of ratchet elements equally distributed and positioned between the rotating ring and the stationary ring, wherein each ratchet element is configured to engage with or disengage from the plurality of saw teeth by centrifugal forces based upon rotation of the motor shaft, and wherein each ratchet element comprises a slot to bring all ratchet elements of the plurality of ratchet elements into load sharing and the plurality of ratchet elements will engage easier in the plurality of saw teeth since some play and/or tolerance is provided by each ratchet element, wherein each ratchet element comprises an opening in a longitudinal direction of the ratchet element, wherein the slot extends in the longitudinal direction, the longitudinal direction being parallel to an axis of rotation of the non-reverse ratchet assembly, wherein the opening is arranged centrically within each ratchet element for limiting stress concentration, wherein the slot physically touches an end of the opening, wherein each ratchet element comprises an angled side face, and wherein the slot extends in a vertical direction from the opening toward the angled side face of each ratchet element.

10. The vertical shaft motor of claim 9, further comprising an end cap, the stationary ring being coupled to the end cap or being incorporated in the end cap.

11. The vertical shaft motor of claim 9, further comprising an end cap, the end cap being configured as the stationary ring.

12. The vertical shaft motor of claim 9, wherein a number of the plurality of saw teeth is twice the number of the plurality of ratchet elements.

13. The vertical shaft motor of claim 9, wherein each ratchet element comprises at least one spring to facilitate engaging with or disengaging from the plurality of saw teeth.

14. The vertical shaft motor of claim 13, wherein the at least one spring is located in a recess of the ratchet element and supported by a pin fastened to the rotating ring and extending in the recess.

15. The vertical shaft motor of claim 13, wherein the at least one spring is compressed when the ratchet element is disengaged from the plurality of saw teeth, and is decompressed when the ratchet element is engaged with the plurality of saw teeth.

16. The vertical shaft motor of claim 15, wherein the at least one spring is designed to be compressed or decompressed at a speed lower than an operating speed of the vertical shaft motor.

17. The vertical shaft motor of claim 16, wherein the at least one spring is designed to be compressed or decompressed at a speed between 200 rpm and 300 rpm of the vertical shaft motor.

18. The vertical shaft motor of claim 9, wherein the plurality of ratchet elements, when engaged with the plurality of saw teeth, are designed to stop rotation of the motor shaft and to prevent rotation of the motor shaft in an opposite direction compared to a normal operation shaft rotation.

19. The vertical shaft motor of claim 9, wherein the vertical shaft motor drives one or more water pumps.

* * * * *